(No Model.)
A. F. CHACE.
VEHICLE WHEEL.
No. 570,697. Patented Nov. 3, 1896.
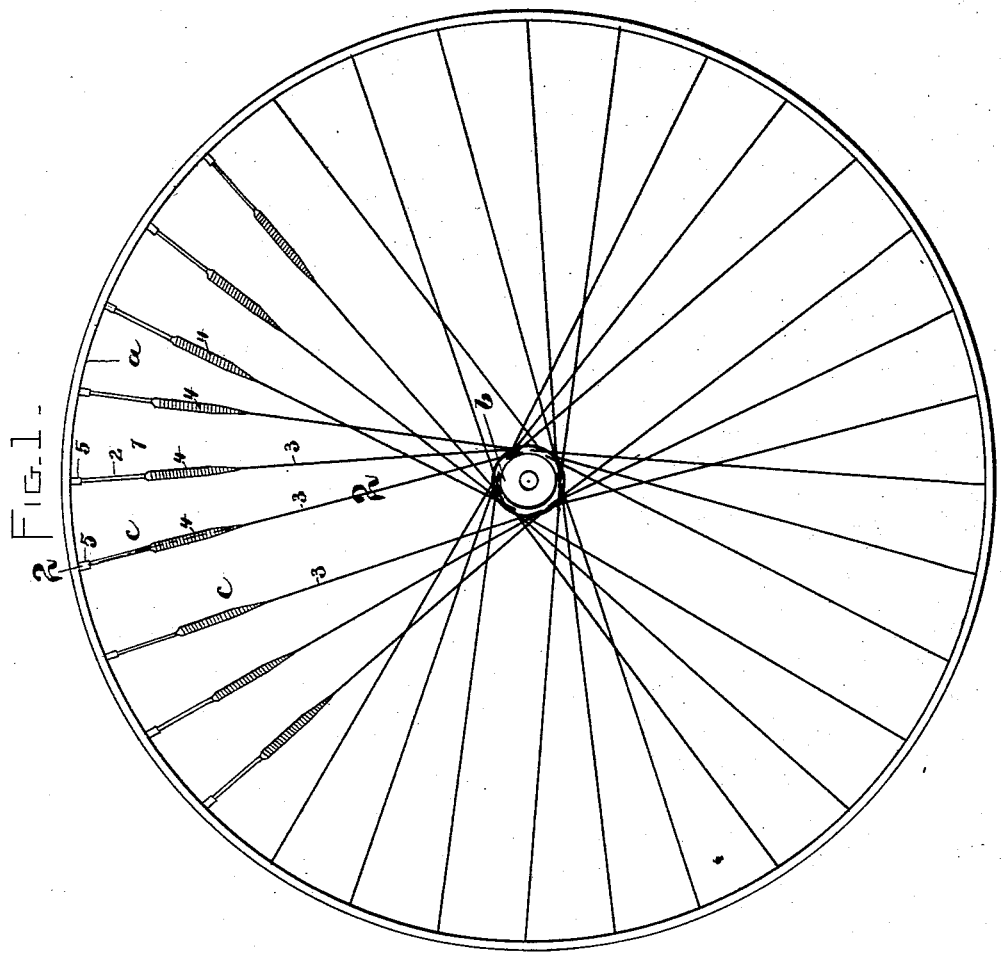
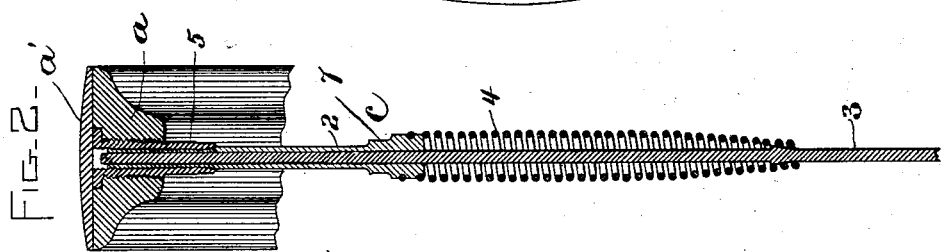
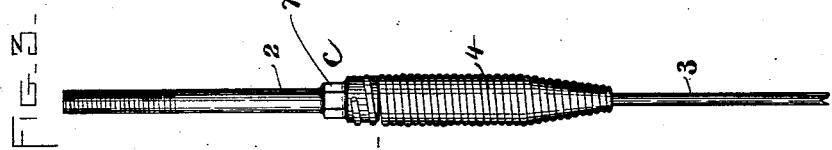
WITNESSES:
A. D. Harrison
A. D. Adams
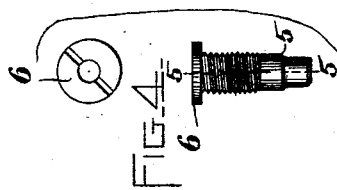
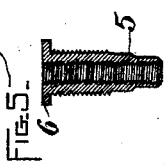
INVENTOR:
A. F. Chace
Wright Brown & Quimby
Attys.

UNITED STATES PATENT OFFICE.

ALBERT F. CHACE, OF BOSTON, MASSACHUSETTS.

VEHICLE-WHEEL.

SPECIFICATION forming part of Letters Patent No. 570,697, dated November 3, 1896.

Application filed January 4, 1896. Serial No. 574,317. (No model.)

*To all whom it may concern:*

Be it known that I, ALBERT F. CHACE, of Boston, in the county Suffolk and State of Massachusetts, have invented certain new and useful Improvements in Vehicle-Wheels, of which the following is a specification.

This invention relates to elastic wheels, and particularly to wheels for light vehicles, such as for bicycles.

The invention has for its object to provide a construction of wheel whereby the desired elasticity shall reside in the spokes instead of in the tire without sacrificing the necessary strength and stiffness of the spokes.

The invention consists in the improvements which I will now proceed to describe and claim.

Of the accompanying drawings, forming a part of this specification, Figure 1 represents a side elevation of a wheel provided with my improvements, some of the spokes of the wheel being represented by conventional lines to avoid unnecessary repetition of the details of construction of the spokes which embody my invention. Fig. 2 represents a section on line 2 2 of Fig. 1. Fig. 3 represents a side elevation of a portion of one of the telescopic spokes. Fig. 4 shows the sleeve or socket which connects the outer member of the telescopic spoke to the wheel-rim. Fig. 5 represents a section on line 5 5, Fig. 4.

The same letters and figures of reference represent the same parts in all the figures.

In the drawings, $a$ represents a rim or felly, and $b$ represents a hub. Said parts may be of any suitable construction adapted for use in connection with the improved telescopic spokes hereinafter described.

$c$ $c$ represent the said telescopic spokes, each being composed of a tubular member 2, attached to one of the parts, preferably the rim, and an elongated member 3, adapted to be attached at one end to the other part, as the hub, and having a sliding fit in the tubular member, so that the spoke can be varied in length within certain limits. The two members 2 and 3 are connected by a helical spring 4, one end of which is affixed to the member 2 and the other end to the member 3. Said spring is normally closed, its convolutions coming together when the spoke is disconnected from the rim or from the hub or both. The arrangement of the parts of the spokes is such that when the parts of the wheel are assembled the spokes will be extended beyond their normal length, the convolutions of the spring being separated, as shown in Fig. 2, so that each spring tends to shorten the spoke of which it is a part by drawing the elongated member 3 into the tubular member 2. Each spoke being constructed in the manner above described, (although in Fig. 1 I have shown the springs on only a portion of the spokes,) it will be seen that the hub is elastically supported in all directions, the springs exerting a pull in all directions from the hub toward the rim.

The bearings afforded by the tubular sections on the elongated sections give the spokes sufficient stiffness to prevent them from being deflected and permitting the collapse of the wheel when the vehicle is turning a sharp curve, the strength of the telescopic spokes constructed as shown being practically equal to that of continuous wire spokes of the diameter of the elongated section 3.

The tubular sections or members 2 are here shown as externally screw-threaded at their outer ends and adjustably engaged with internally-screw-threaded sleeves or sockets 5, each socket being externally screw-threaded for engagement with the rim $a$, as shown in Fig. 2, and provided with a slotted head 6, whereby it may be inserted in the rim by the use of a screw-driver. The tubular member 2 is provided with a polygonal portion 7, adapted to be grasped by a wrench for the purpose of rotating said member and adjusting it in the socket 5. By this construction I am enabled to independently adjust the tension of the springs 4. The elongated sections 3 may be formed at their inner ends in any suitable way for attachment to the hub.

A telescopic spoke constructed as described constitutes an improved article of manufacture, which may be manufactured and sold as such for attachment to any suitable wheel rim and hub.

I find that a wheel of the construction above described is sufficiently elastic for use in a bicycle without the employment of a pneumatic tire.

In Fig. 2 I show the wheel-rim provided with an ordinary metal tire $a'$.

I am aware that it has been heretofore proposed to make a metal wheel the spokes of which are fitted to slide in sockets formed in the hub, normally closed helical springs being connected with the spokes and hub so as to be extended by the weight imposed upon the hub. The only instance of such construction of which I am aware requires a specially-constructed hub, and does not afford the elongation of the telescopic portions necessary to give suitable stiffness to the spokes. I am the first, so far as I am aware, to provide a wheel with telescopic spokes each of which constitutes an independent structure adapted to act telescopically independently of the hub, so that the spokes may be used with any of the ordinary hubs which are now used with ordinary wire spokes, the independent telescopic action permitting the elongated bearing of each member on the other which is necessary to give the spoke sufficient stiffness and resistance to lateral strain.

I claim—

1. A wheel comprising a rim or felly; a hub; a series of independent telescopic spokes, each composed of two members, one member being a tube rigidly secured to the rim, and the other member a rod rigidly secured to the hub and having an elongated sliding fit in the said tube; normally-closed springs attached to said members and held under tension thereby, each spring exerting a shortening or contracting strain on the telescopic spoke to which it is attached; and means for adjusting the tubular members of the spokes to vary said strain.

2. A wheel comprising a rim or felly; a hub and a series of telescopic spokes each composed of an internally-threaded sleeve attached to the rim, an externally-threaded tubular member adjustably engaged with said sleeve, an elongated member attached at one end to the hub, its other end having a sliding fit in the tubular member, and a normally-closed helical spring attached at one end to the tubular member and at its other end to the elongated member, said spring being held extended by the spoke members, hub and rim.

3. As an article of manufacture a telescopic spoke composed of a tubular member externally screw-threaded at its outer end, an internally-screw-threaded sleeve or socket adjustably engaged with said tubular member and adapted for attachment to a wheel-rim, an elongated member formed at its inner end for attachment to a hub, its outer end having a sliding fit in the tubular member, and a normally-closed spring attached at its ends to said members and yieldingly connecting the same.

In testimony whereof I have signed my name to this specification, in the presence of two subscribing witnesses, this 1st day of January, A. D. 1896.

ALBERT F. CHACE.

Witnesses:
C. F. BROWN,
A. D. HARRISON.